United States Patent Office 3,341,495

Patented Sept. 12, 1967

3,341,495

FERROCENE POLYMERS

Eberhard W. Neuse, Santa Monica, Calif., assignor, by mesne assignments, to McDonnell Douglas Corporation, Santa Monica, Calif., a corporation of Maryland No Drawing. Filed Sept. 12, 1963, Ser. No. 308,318
5 Claims. (Cl. 260—67)

This invention relates to the preparation of ferrocene polymers.

In my copending application, Serial No. 233,913, filed October 29, 1962, now U.S. Patent No. 3,238,185, entitled "Ferrocene Polymers," I have described the preparation of ferrocene polymers of the type:

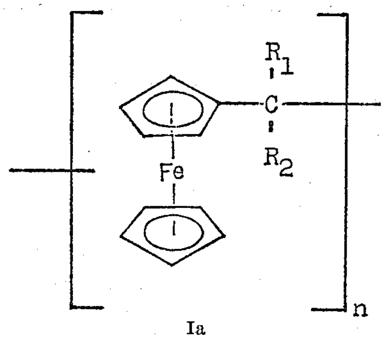

Ia wherein $R_1$ and $R_2$ are H, $CH_3$, phenyl, etc. Each polymer chain is believed to contain a double-bridged segment either of the type IIa or the type IIb, below:

The same holds correspondingly for the position of the substituents R′ and R″ in Formulae IIa and IIb.

These polymers are formed by two different methods, as follows: (1) By polycondensation of ferrocenyl carbinols, such as hydroxymethyl ferrocene.

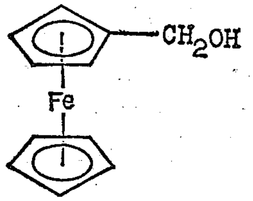

III (2) By polycondensation of N,N-dimethylaminomethylferrocene, or its derivatives having the structural formula

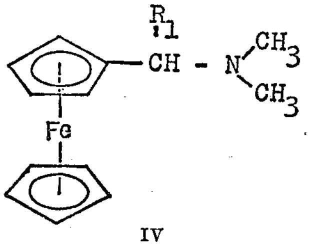

IV wherein $R_1$ is as defined above.

In accordance with the present invention a different type of ferrocene polymer is prepared by different types

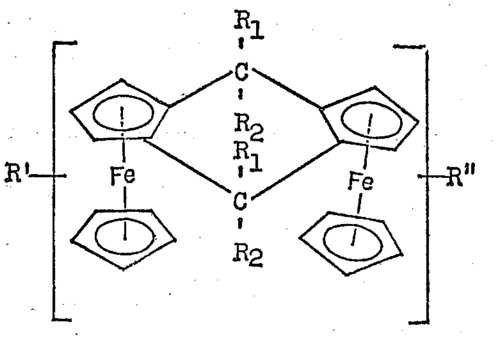

IIa or

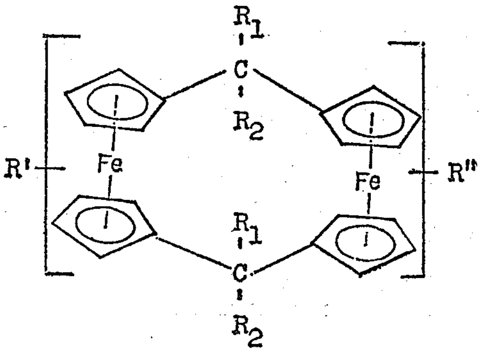

IIb wherein R′ and R″ represent polymer chains and $R_1$ and $R_2$ are H, $CH_3$, $C_6H_5$ or the like. The centered position of the substituent link on the left-hand side of Formula Ia is not to indicate direct bonding on the iron atom, but rather a mixed pattern of 1,2-homoannular, 1,3-homoannular and 1,1′-heteroannular substitution as depicted by the three segment structure Ib below:

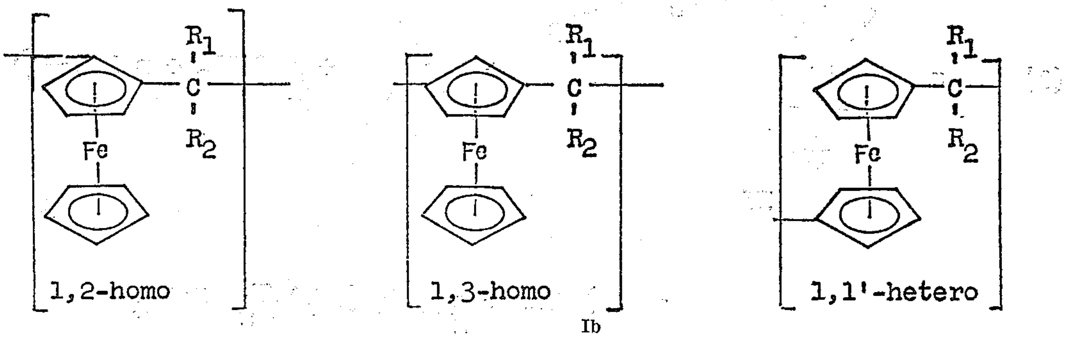

Ib of reaction. The polymers of the present invention have a repeating unit of the novolac type as follows:

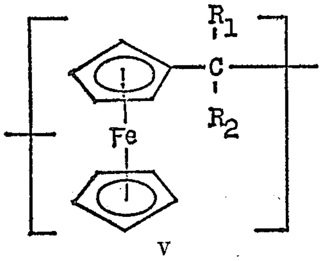

V wherein $R_1$ and $R_2$ are H, or alkyl groups such as methyl, ethyl, etc., or aryl groups such as phenyl or aralkyl groups such as benzyl, phenylethyl, etc. These polymer chains, in contrast to the previously claimed polymers Ia, are lacking a double-bridged segment of the types IIa and IIb depicted above and can thus be represented by Formula VI:

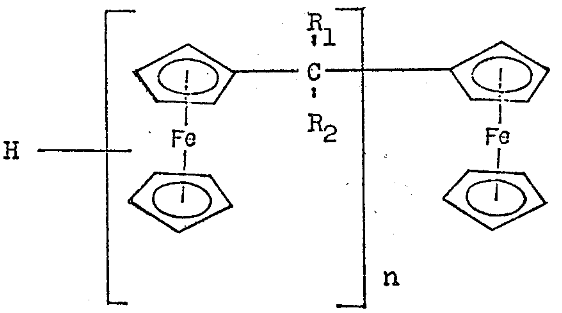

VI

In Formulae V and VI, as well as in others presented in the following, again the position of the substituent link on the left-hand side denotes a mixed substitution pattern of the type shown in Ib. It will also be understood that the cyclopentadienyl rings may be substituted, e.g., by low molecular weight alkyl groups (e.g., methyl, ethyl, etc.) or aryl groups (e.g. phenyl), or aralkyl groups (e.g., benzyl and phenyl ethyl); also by halogens (e.g., chlorine) nitro or amino groups. Moreover, there may be branching of the chain. The centered position of the link on the left-hand side of Formula VI does not indicate direct bonding to the iron atom but, as explained above in connection with Formulae IIa and IIb it indicates a mixed pattern or 1,2-homoannular, 1,3-homoannular and 1,1'-heteroannular substitution in the manner indicated hereinabove.

Those polymers of type VI in which $R_1$ and $R_2$ are both hydrogen are especially useful because of their high weight ratio of ferrocene to non-ferrocene groupings, this ratio being about 13:1, corresponding to a ferrocene content of 93%. These preferred polymers have the formula

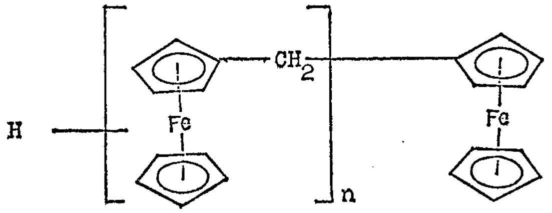

VII

They are especially useful as components of rocket propellants (wherein the ferrocene unit in the polymer has the function of a burning rate controller) because, per pound of polymer, there is a higher proportion of iron than in those polymers where one or more of the methylene hydrogens is subtituted by methyl, ethyl, or higher alkyl, aryl, or aralkyl groups. In those instances where *n* has a value higher than unity, polymer VII has additional utility for the stated purpose because, in contrast to monomeric ferrocene, it is not volatile, hence is not lost and does not diffuse during processing of a rocket propellant nor during storage, shipment or the preparation of a rocket for firing. These polymers can be used to advantage in sealants, varnishes and laminates, particularly to impart heat stability. Thus these polymers can be added to phenolic resins in the A stage to produce adhesives, potting agents and laminating agents, wherein the ferrocenyl polymers impart greater heat stability. Also, these polymers can be used as substitutes (having much lower volatility) for ferrocene as catalysts in combustion reactions. A further use is as electron exchange agents, by reason of the reversible reaction $$Fe^{++} \rightleftarrows Fe^{+++}$$

Thus by passing a solution of a reducible ion through a column of such polymer it can be reduced. Also, these polymers are effective absorbers of ultraviolet, nuclear and gamma radiation and can be used as protective coatings or layers on equipment subjected to such radiation. Also these polymers can be added to various transparent polymers to impart laser characteristics.

Polymers of the type VII above ($R_1$ and $R_2$=H) can be prepared by either of two reactions, as follows:

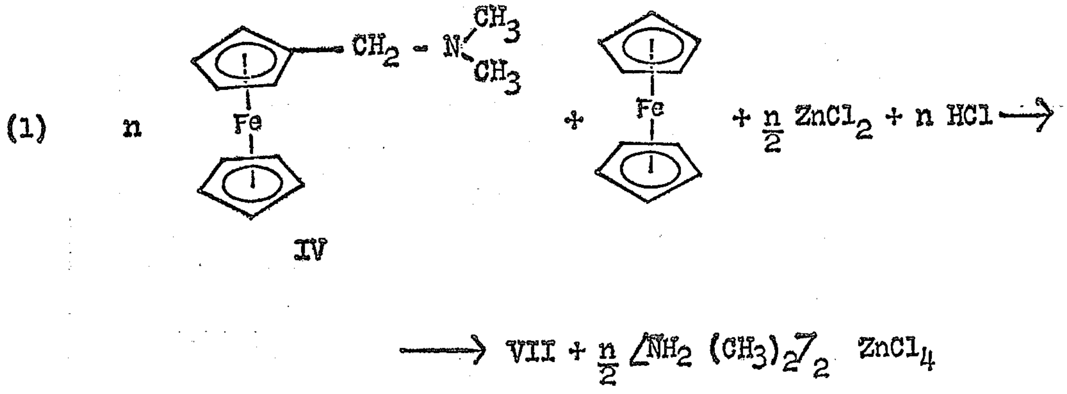

(2)

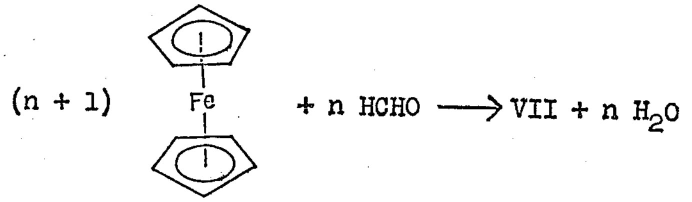

(2a)

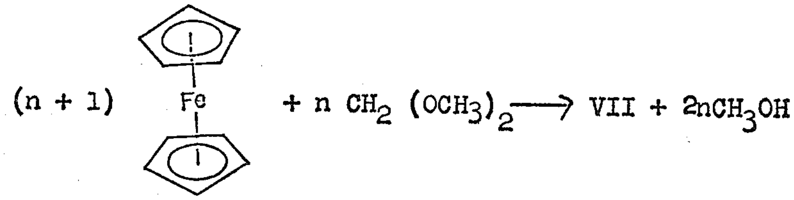

In reaction (1), the condensation is carried out in the melt phase under nitrogen at atmospheric pressure, using as catalyst a combination of a Lewis acid, preferably $ZnCl_2$ but permissibly $AlCl_3$, $BF_3$, etc., and HCl, both components being in the stoichiometric ratio as indicated in the equation. Employing a molar excess of HCl over the stoichiometric amount, while resulting in substantially shortened reaction times, at the same time leads to crosslinking and partial destruction of the ferrocene molecule and, therefore, requires more careful control of the reaction conditions. In lieu of the HCl component, water can also be used; in this case, however, considerably higher concentrations of $ZnCl_2$ are required, the latter component furnishing HCl by partial hydrolysis. It has also been found that the catalyst components can be introduced in the form of the addition complex, described in the aforesaid copending application, of the amine IV, $ZnCl_2$ and HCl, having the composition:

$$2C_{10}H_9Fe{-}CH_2{-}N(CH_3)_2 \cdot ZnCl_2 \cdot 2HCl$$

VIII

Using this complex, polycondensation with resulting formation of VII is achieved by simply heating it for a sufficiently long time in the presence of ferrocene at temperatures well above the melting point, i.e., at 160–180°. In still another approach, the hydrochloride of N,N-dimethylaminomethylferrocene is heated with $ZnCl_2$ and ferrocene, yielding the same polymer VII.

In reaction (2) and also in reaction (*2a*), in which formaldehyde dimethylacetal (dimethoxymethane) substituted for formaldehyde, Lewis acid catalysts, such as $ZnCl_2$ or $AlCl_3$, are used, but at lower concentrations, e.g., at 5–20% (by weight of ferrocene), and the reaction is carried out in a closed system (sealed glass tubes or autoclave). Reaction (*2a*) is preferred. Under such conditions, temperature-dependent melt equilibria are attained, and the conversions remain correspondingly low, i.e., in the range from 60 to 70% in autoclave reactions (with reactions conducted in sealed glass tubes, conversions are usually higher by approximately 5%). However, the unrecated ferrocene can be recovered to a major extent and re-used. At temperatures substantially exceeding 175–180°, further increased conversions (up to ca. 80%) are observed; however crosslinking becomes noticeable and the polymers obtained tend to increasingly deviate in composition from structure VII.

For further utilization of low molecular weight fractions still containing unreacted ferrocene, they may be subjected to a post-condensation with formaldehyde or its acetal under comparable conditions resulting in further consumption of the ferrocene present, coupled with increased molecular weight of the condensation products.

The following specific examples will serve further to illustrate the practice and advantages of the invention.

*Example 1.—Condensation of N,N-dimethylaminomethylferrocene with ferrocene—(Reaction (1))*

Into a 200 ml. round bottom flask equipped with mechanical stirrer and gas inlet and outlet tubes was placed 15.0 g. (0.0622 mole) of N,N-dimethylaminomethylferrocene (IV) and 4.30 g. (0.0312 mole) of anhydrous zinc chloride of 99% purity. After flushing the system with dry nitrogen, 5.98 g. (0.0622 mole) of 38% aqueous hydrochloric acid was added with vigorous agitation. Under a steady stream of nitrogen, the mixture was quickly heated in an oil-bath to 150°. (All temperatures are centigraded.) Upon the addition of 2.32 g. (0.0126 mole) of ferrocene, the bath temperature was raised to 165°. Heating was continued at this temperature with stirring for 7.5 hours, until the melt had become highly viscous and agglomerated around the stirrer blades, and the water extract of a sample of the melt no longer exhibited a yellow color.

The cold, pulverized melt was exhaustively extracted with warm water to remove residual catalyst and ionic byproducts, and, after drying, was dissolved in 300 ml. of benzene. The filtered solution was poured with vigorous stirring into 2 liters of isopropanol, and the precipitated polymer portion (referred to as the first fraction) was washed with isopropanol and dried for 10 days at 60° in vacuo, to give 8.96 grams (69.6% yield) of yellow-tan, fine-powdery solid exhibiting the melting range 130–155° and the number-average molecular weight ($M_n$) 3650.

*Analysis.*—Calcd. for VII: C, 66.60; H, 5.10; Fe, 28.30. Found: C, 67.01; H, 5.13; Fe, 27.93.

From the combined mother-liquor and washing liquids, by concentrating to ca. 400 ml. and precipitating with excess water, a further portion essentially consisting of oligomers and unreacted ferrocene was isolated. Upon removal of the latter ingredient by vacuum sublimation or chromagtography on activated alumina, the residual solid, herein designated as second fraction, weighed 2.02 g. (13.0% yield) and showed the melting range 70–85°; $M_n$, 850.

*Analysis.*—Calcd. for VII: C, 66.24; H, 5.16; Fe, 28.60. Found: C, 66.34; H, 5.31; Fe, 28.38.

The total polymer yield (combined first and second fractions) thus amounted to 82.6%.

The crude polymer may be purified chromatographically by passing its concentrated benzene solution through a short column packed with alumina of a low degree of activity and eluting with the same solvent. This process serves the purpose of removing traces of admixed polymeric oxidation products. However, with the polymer adsorptivity being enhanced with increasing molecular weight, its use is unfeasible for the higher members.

Further fractionation to more monodisperse subfractions with $M_n$ values ranging from ca. 400 to 15,000 may be achieved by fractional precipitation from benzene, using isopropanol and, at a later stage, aqueous isopropanol, as the precipitants. Fine, powdery, yellow-to-tan solids are obtainable from these resinous subfractions by re-precipitation from concentrated dioxane solution into excess methanol or isopropanol (using 90% aqueous ethanol for the last fractions), then drying several days in vacuo at a temperature well below the melting range. The polymer cuts thus obtained are soluble in dioxane, benzene, chloroform, pyridine, N-methylpyrrolidone; insoluble in water and practically so in aliphatic alcohols, ether, acetone and hexane. As the molecular weight decreases, increased crystallinity and enhanced solubility in aliphatic alcohols, hexane, ether, etc. is noticeable. The range of $M_n$ above stated (i.e., about 400 to 15,000) corresponds to values of $n$ in Formula VI ranging from about 1 to about 75.

Other examples in which the $ZnCl_2$—HCl catalyst system was employed are summarized in Table I, stating reaction conditions, yields, and elemental composition data on the first fractions.

A mixture of 23.0 g. (0.0822 mole) of N,N-dimethylaminomethylferrocene hydrochloride, 7.65 g. (0.0411 mole) of ferrocene and 5.67 g. (0.0411 mole) of 99% anhydrous zinc chloride was well ground in a dry box and was placed into a 200 ml. round-bottom flask equipped as in Example 1. The flask was inserted into an oil-bath pre-heated to 170°, and stirring was started. Under a blanket of dry nitrogen, heating was continued at this temperature for 6 hours. Workup was accomplished in the manner described in Example 1, to give 11.77 g. (68.0% yield) of the first fraction $M_n$, 2690, and 2.29 g. (10.8%) of the second fraction, $M_n$, 740, with total polymer yield thus amounting to 78.8%.

The analytical data were as follows:

*Analysis.*—Calcd. for VII (first fraction): C, 66.56; H, 5.11. Found: C, 66.44; H, 5.19.

*Analysis.*—Calcd. for VII (second fraction): C, 66.17; H, 5.17. Found: C, 66.09; H, 5.29.

TABLE I

| Molar Ratio Compound IV/Ferrocene | Catalyst Concentration [1] | | | Temp. (° C.) | Time (hrs.) | Total Polymer [2] Yield | $M_n$ of First Fraction | Anal. Calcd. for First Fraction | | | Anal. Found on First Fraction | | |
|---|---|---|---|---|---|---|---|---|---|---|---|---|---|
| | $ZnCl_2$ | HCl | $H_2O$ | | | | | C | H | Fe | C | H | Fe |
| 3:1 | 0.55 | 1.0 | 3.305 | 170 | 7 | 82.9 | 2,970 | 66.58 | 5.11 | 28.31 | 66.51 | 5.20 | 27.58 |
| 2:1 | 0.5 | 1.0 | 3.305 | 170 | 8 | 85.8 | 2,490 | 66.56 | 5.11 | 28.33 | 66.49 | 5.32 | 27.82 |
| 1:1 | 0.55 | 1.0 | 3.305 | 165 | 12 | 77.5 | 2,210 | 66.53 | 5.12 | 28.35 | 66.89 | 5.25 | 27.76 |
| 0.5:1 [3] | 0.5 | 1.0 | 3.305 | 170 | 7 | 80.6 | 2,304 | 66.54 | 5.12 | 28.34 | 66.39 | 5.37 | 27.49 |

[1] n moles, for every mole of Compound IV.
[2] Combined yield of first and second fractions, in percent of theory.
[3] Dioxane used in lieu of benzene as solvent.

*Example 2.—Condensation of N,N-dimethylaminomethylferrocene with ferrocene—(Reaction (1))*

Empolying the same equipment as used in the preceding example, the mixture of 5.0 g. (0.0207 mole) of N,N - dimethylaminomethylferrocene (IV), 2.85 g. (0.0207 mole) of 99% anhydrous zinc chloride and 0.37 g. (0.0205 mole) of water was heated with stirring under nitrogen, until the temperature had reached 160°. Upon the addition of 0.96 g. (0.0052 mole) of ferrocene, the bath temperature was raised to 170° and there maintained for 6 hours. The condensation product was worked up as described in Example 1 to give 3.32 g. (77.3% yield) of the first fraction, melting range 125–135°, $M_n$, 3700.

*Analysis.*—Calcd. for VII: C, 66.60; H, 5.10; Fe, 28.30. Found: C, 66.79; H, 5.26; Fe, 28.25.

The second fraction was obtained in 9.9% yield (0.51 g.), melting range 75–85°, $M_n$, 820.

*Analysis.*—Calcd. for VII: C, 66.22; H, 5.17; Fe, 28.61. Found: C, 65.89; H, 5.28; Fe, 28.89.

Total yield (first and second fractions): 87.2%.

Other condensations, in which the $ZnCl_2$—$H_2O$ catalyst system was used, are summarized in Table II.

*Example 4.—Condensation of ferrocene with formaldehyde—(Reaction (2a))*

This example illustrates the use of the aldehydic component in the form of its acetal.

The reactor was a stainless-steel lined, high-pressure (5000 p.s.i.) autoclave of 1 liter capacity, equipped with mechanical stirrer, thermometer well and thermocouple, bleeding valve, and a special safety head (rupture disc tested to 3500 p.s.i.). A heater mantle with thermostat-controlled power input provided for uniform heating of the reactor walls. The vessel was flushed with dry nitrogen and was charged with the mixture of 372.1 g. (2.0 mole) of ferrocene and 18.6 g. (5% by weight of the ferrocene) of 99% anhydrous zinc chloride previously ground together in a dry box. The solid occupied about one-half the total internal volume. Upon the addition of 183.0 g. (2.4 mole) of dimethoxymethane precooled to 0°, the autoclave was quickly closed and bolted. Heat was then gradually applied so as to raise the internal temperature within 1.5 hours to 170±2°. Heating was continued at this level for 9 hours, the temperature being recorded on an *x-y* recorder. During the entire reaction period, the

TABLE II

| Molar Ratio Compound IV/Ferrocene | Catalyst Concentration [1] | | Temp. (° C.) | Time (hrs.) | Total Polymer [2] Yield | $M_n$ of First Fraction | Anal. Calcd. for First Fraction | | | Anal. Found on First Fraction | | |
|---|---|---|---|---|---|---|---|---|---|---|---|---|
| | $ZnCl_2$ | $H_2O$ | | | | | C | H | Fe | C | H | Fe |
| 2:1 | 1.0 | 1.0 | 160 | 8 | 78.8 | 2,330 | 66.54 | 5.12 | 28.34 | 66.59 | 5.45 | 27.84 |
| 1:1 | 1.1 | 1.1 | 170 | 11 | 80.9 | 2,550 | 66.56 | 5.11 | 28.33 | 66.07 | 5.13 | 28.02 |
| 0.4:1 [3] | 1.0 | 1.0 | 155 | 9 | 88.8 | 1.980 | 66.51 | 5.12 | 28.37 | 66.45 | 5.24 | 28.11 |

[1] In moles, for every mole of Compound IV.
[2] Combined yield of first and second fractions, in percent of theory.
[3] Dioxane used in lieu of benzene as solvent.

*Example 3.—Condensation of N,N-dimethylaminomethylferrocene with ferrocene—(Reaction (1))*

This example illustrates a reaction carried out using the hydrochloride of compound IV ($R_1$=H) in place of the individual components, IV and HCl.

agitator was actuated to ensure homogeneous mixing of the melt. Upon cooling to room temperature, the reaction mass, a semi-resinous solid covered by a condensed, liquid phase mainly consisting of methanol and unreacted acetal with dissolved catalyst, was thoroughly digested and washed with water. The insoluble solid, after drying for 3 days in vacuo over $P_2O_5$, weighed 395 g. It was dissolved in 500 ml. of benzene. The filtered solution, upon concentration to about 300 ml., was slowly stirred into 4 liters of isopropanol. The precipitated polymer portion, after reprecipitation in the same manner, was obtained as a yellow solid constituting the first fraction. It was washed and dried as described in Example 1 to yield 159.6 g. (40.5%); melting range 115–130°, $M_n$, 2190.

*Analysis.*—Calcd. for VII: C, 66.52; H, 1.12; Fe, 28.36. Found: C, 66.33; H, 5.19; Fe, 27.84.

The second fraction, after removal of 45.7 g. of intermixed ferrocene, weighed 79.1 g. (20.4% yield); melting range 100–105°, $M_n$, 590.

*Analysis.*—Calcd. for VII: C, 66.02; H, 5.19. Found: C, 65.78; H, 5.33.

Additional examples of polycondensations of ferrocene with formaldehyde, the latter component either used as such (paraformaldehyde) or as its dimethyl acetal, are summarized in Table III. The same procedure was employed with paraformaldehyde except that it was added in pulverized form and was ground with the ferrocene and catalyst.

stream, it was combined with the main product to give a total of 43.7 g. (84.7%) of crude polymer. $M_n$, 1430.

*Analysis.*—Calcd. for VI ($R_1$=H, $R_2$=$C_6H_5$): C, 73.18; H, 5.18; Fe, 21.64. Found: C, 73.33; H, 5.25; Fe, 21.39.

When condensation was conducted at 80° and 100°, instead of 120°, the condensations led to yellow-colored polymers with $M_n$ (rounded-off mean values from several runs) 1100 and 1250, respectively. Typical analytical data are as follows:

For product with $M_n$, 1140—

*Analysis.*—Calcd.: C, 72.87; H, 5.19; Fe, 21.94. Found: C, 73.01; H, 5.31; Fe, 21.76.

For product with $M_n$, 1270—

*Analysis.*—Calcd.: C, 73.04; H, 5.19; Fe, 21.77. Found: C, 72.91; H, 5.25; Fe, 21.60.

At 135° oil-bath temperature, the polymer obtained was of a light-tan color. $M_n$, 2300.

*Analysis.*—Calcd.: C, 73.68; H, 5.17; Fe, 21.15. Found: C, 73.87; H, 5.31; Fe, 20.86.

In all cases, crude polymer yields ranged from 80 to 92%.

TABLE III

| Molar Ratio Ferrocene/Aldehyde | Form of Aldehyde | $ZnCl_2$ Conc.[1] | Temp. (° C.) | Time (hrs.) | Total Polymer Yield [2] | $M_n$ of First Fraction | Anal. Calcd. for First Fraction | | | Anal. Found for First Fraction | | |
|---|---|---|---|---|---|---|---|---|---|---|---|---|
| | | | | | | | C | H | Fe | C | H | Fe |
| 1:0.8 | Dimethyl acetal | 5 | 170 | 10 | 53.7 | 860 | 66.24 | 5.16 | 28.60 | 66.27 | 5.10 | 28.51 |
| 1:1 | do | 5 | 170 | 9 | [3] 59.5 | 1,320 | 66.41 | 5.13 | 28.46 | 66.63 | 5.30 | 28.14 |
| 1:1 | do | [4] 10 | 170 | 3 | [5] 27.1 | 3,900 | 66.61 | 5.10 | 28.29 | 66.50 | 5.38 | 26.88 |
| 1:1.4 | do | 5 | 170 | 9 | 65.1 | 2,250 | 66.53 | 5.12 | 28.35 | 66.63 | 5.16 | 28.08 |
| 1:1.4 | do | 5 | 190 | 18 | [5] 32.2 | 3,100 | 66.58 | 5.11 | 28.31 | 67.54 | 5.38 | 26.83 |
| 1:1.7 | Paraformaldehyde | 10 | [6] 130 | 6 | 55.6 | 2,140 | 66.52 | 5.12 | 28.36 | 66.28 | 5.18 | 28.29 |
| 1:1.7 | do | [4] 5 | 130 | 4 | [5] 20.3 | 3,350 | 66.59 | 5.11 | 28.30 | 67.36 | 5.33 | 26.90 |
| 1:2 | do | [4] 10 | 170 | 2 | [7] 0 | ---- | ---- | ---- | ---- | 68.13 | 5.57 | [8] 25.67 |
| 1:2 [9] | do | [10] 10 | 170 | 6 | 80.4 | 1,870 | 66.49 | 5.12 | ---- | 66.33 | 5.11 | ---- |

[1] In percent b.w. of ferrocene.
[2] In percent of theory, based on ferrocene. Only soluble polymer recorded.
[3] Similar yield, Mn and composition with 15% $ZnCl_2$ concentration and 6 hrs. heating time.
[4] Anhydrous $AlCl_3$ in lieu of $ZnCl_2$.
[5] In addition large portion of crosslinked polymer of similar elemental composition.
[6] At higher temperatures change in composition of (soluble) polymer; in addition, formation of crosslinked matter.
[7] Only crosslinked condensation product. Same reaction course with $BF_3$ as catalyst, added as ethereate.
[8] Analysis on crosslinked reaction product.
[9] Molar ratio oligomer ($M_n$ 780)/acetal in postcondensation experiment.
[10] In percent b.w. of oligomer.

*Example 5.—Condensation of ferrocene and benzaldehyde. Formation of* VI ($R_1$=H, $R_2$=$C_6H_5$)

The condensation of ferrocene with benzaldehyde is illustrated by the following typical experiment. The well-ground mixture of 37.2 g. (0.2 mole) of ferrocene and 3.72 g. of zinc chloride was placed into a 200 ml. of round-bottom flask equipped with mechanical stirrer and two side-tubes attached to the upper part of the bulb. Upon the addition of 21.2 g. (.02 mole) of benzaldehyde, the mixture was heated with stirring in an oil-bath adjusted to 120°. Throughout the condensation, a slow current of dry nitrogen was passed through the side-tubes. The orange-brown liquid gradually turned homogeneous and viscous, allowing strings to be drawn from the melt. Heating was discontinued after 10 hours. At this point, the mass had completely resinified, rendering further stirring difficult.

The solidified melt was ground and digested with water and cold methanol to remove catalyst and a small portion of unreacted ferrocene. The orange-brown, powdery residue was dried in vacuo and taken up in 300 ml. of dimethyformamide. The filtered solution was poured dropwise and with vigorous agitation into the three-fold volume of 95% aqueous methanol to precipitate the polymer as a yellow, fine-powdery solid, which was dried for 7 days at 60° in vacuo; dry weight 39.9 g. By adding excess water to the mother-liquor and allowing the formed precipitate to settle, a small second crop of essentially oligomeric material was obtained. After removal of contaminating ferrocene by sublimation at 70° in a nitrogen

*Example 6.—Condensation of ferrocene and acetaldehyde. Formation of* VI ($R_1$=H, $R_2$=$CH_3$)

Employing the equipment and procedure of Example 4, 2.0 moles of ferrocene and 2.0 moles of freshly distilled acetaldehyde were reacted with anhydrous zinc chloride (10% by weight of ferrocene). Heating time was 7 hours, the temperature being 160°. The first polymer fraction, obtained in 30.5% yield by precipitation from benzene solution, showed melting range 95 to 115°; $M_n$, 1230.

*Analysis.*—Calcd. for VI ($R_1$=H, $R_2$=$CH_3$): C, 67.45; H, 5.66; Fe, 26.89. Found: C, 67.00; H, 5.77; Fe, 26.31.

The second fraction, melting range 90 to 105°, $M_n$ 630, was collected in 27.3% yield.

*Analysis.*—Calcd. for VI ($R_1$=H, $I_2$=$CH_3$): C, 66.92; H, 5.62; Fe, 27.46. Found: C, 67.03; H, 5.80; Fe, 27.16.

It will be apparent that, by substituting alkyl or aryl derivatives, homologues of ferrocene (e.g., methylferrocene, phenylferrocene or the various dimethyl- or diphenylferrocenes, etc.) and/or halogenated, e.g., chlorinated ferrocenes and/or by substituting other aldehydes in reaction 2 and/or by substituting homologues of compound IV wherein one or both methylene hydrogens are substituted by alkyl (methyl, ethyl, etc.) groups, other polymers of the type VI can be prepared in the same manner and in which the ferrocene nuclei are substituted and/or $R_1$ and $R_2$ are other than hydrogen.

It will, therefore, be apparent that novel and useful compounds and methods of obtaining them have been provided.

I claim:

1. A polymeric mixture of molecules having the structure

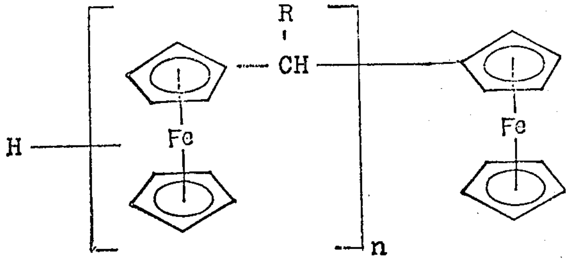

wherein $n$ is a positive integer and R is selected from the group consisting of hydrogen and the methyl radical, such mixture consisting predominantly of such molecules wherein $n$ is substantially in excess of unity, said mixture having a number average molecular weight of at least 860.

2. The method of polymerizing ferrocene which comprises reacting (1) ferrocene with (2) a material selected from the group consisting of formaldehyde and acetaldehyde, said reaction being carried out by heating a mixture of the reactants in the presence of a Lewis acid catalyst, such heating being carried out in the substantial absence of a solvent and in the melt phase.

3. The method of claim 2 wherein the reactants are employed in molar ratios of approximately 1 mole of ferrocene to 0.5 to 2 mols of reactant (2); and wherein the Lewis acid catalyst is employed in the amount of about 5 to 20% of the weight of ferrocene.

4. The method of claim 3 wherein the Lewis acid is $ZnCl_2$.

5. The method of claim 3 wherein the Lewis acid is $AlCl_3$.

References Cited

UNITED STATES PATENTS 2,709,175 5/1955 Grahan ------------ 260—439

OTHER REFERENCES

Luttringhaus et al.: "Die Makromolekulare Chemie," vol. 44–46, 1961, pp. 669–681.

SAMUEL H. BLECH, *Primary Examiner.*

MURRAY TILLMAN, *Examiner.*